(12) United States Patent
Ghozeil et al.

(10) Patent No.: US 7,293,879 B2
(45) Date of Patent: Nov. 13, 2007

(54) PROJECTION SCREEN

(75) Inventors: Adam Ghozeil, Corvallis, OR (US);
Bjorn Warloe, Corvallis, OR (US);
Will Allen, Corvallis, OR (US);
Michael A. Pate, Tucson, AZ (US);
Jim Przybyla, Philomath, OR (US);
Arthur R. Piehl, Corvallis, OR (US);
Nathan McPherson Moroney, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 730 days.

(21) Appl. No.: 10/691,837

(22) Filed: Oct. 23, 2003

(65) Prior Publication Data

US 2005/0088736 A1 Apr. 28, 2005

(51) Int. Cl.
*G03B 21/14* (2006.01)
(52) U.S. Cl. .......................................... 353/79; 359/452
(58) Field of Classification Search ................. 353/79, 353/84; 359/443, 449, 452
See application file for complete search history.

(56) References Cited

U.S. PATENT DOCUMENTS

| 4,003,080 | A | | 1/1977 | Maiman et al. |
| 4,713,577 | A | | 12/1987 | Gualtieri et al. |
| 4,798,994 | A | | 1/1989 | Rijpers et al. |
| 5,045,706 | A | | 9/1991 | Tanaka et al. |
| 5,095,244 | A | | 3/1992 | Maeda et al. |
| 5,162,160 | A | | 11/1992 | Matsui et al. |
| 5,193,015 | A | * | 3/1993 | Shanks ........................ 349/115 |
| 6,373,184 | B1 | | 4/2002 | Suh et al. |
| 6,428,169 | B1 | * | 8/2002 | Deter et al. ................... 353/20 |
| 6,836,361 | B2 | * | 12/2004 | Hou ............................ 359/443 |
| 6,847,483 | B2 | * | 1/2005 | Lippey et al. ............... 359/443 |
| 6,894,835 | B2 | * | 5/2005 | Ohsako et al. .............. 359/449 |
| 6,961,175 | B2 | * | 11/2005 | Toda et al. .................. 359/452 |
| 6,980,361 | B2 | * | 12/2005 | Lappalainen ................ 359/443 |
| 7,035,006 | B2 | * | 4/2006 | Umeya et al. .............. 359/443 |
| 7,040,764 | B2 | * | 5/2006 | Przybyla et al. ............ 353/84 |
| 7,057,809 | B2 | * | 6/2006 | Kubota et al. .............. 359/443 |
| 2005/0030480 | A1 | * | 2/2005 | Lippey et al. ................ 353/30 |
| 2005/0141084 | A1 | * | 6/2005 | Waters ........................ 359/443 |
| 2005/0207007 | A1 | * | 9/2005 | Shimoda et al. ............ 359/449 |
| 2005/0231800 | A1 | * | 10/2005 | Lippey ........................ 359/443 |

* cited by examiner

*Primary Examiner*—William C. Dowling (57) ABSTRACT

A projection screen for use in a projection system is described. In an embodiment of the present invention, a projection system includes a projector and a projection screen. The projector is configured to project an image composed of visible light in one or more ranges of wavelengths. The projection screen has a plurality of sub-pixels that reflect and/or transmit the one or more ranges of wavelengths to display the image and absorb visible wavelengths of light in at least one other range not included in the one or more ranges. One or more spaces are defined between adjacent sub-pixels that reflect and/or transmit the one or more ranges and the at least one other range.

33 Claims, 10 Drawing Sheets

PROJECTION SCREEN

TECHNICAL FIELD

The present invention generally relates to the field of image projection and more particularly to a projection screen.

BACKGROUND

Projectors are utilized in a variety of environments. From home theaters to business presentations, projectors are provided to offer a wide range of functionality to consumers. For example, a projector may provide a display of a slide show, a display of a movie in a home theater environment, and so on. To display an output of the projector, a projection screen may be utilized. The projection screen may be configured to reflect the output of the projector such that it is viewable by one or more people. For example, a projection screen in a movie theater environment may reflect light that is projected by a movie projector to be viewable by people in the movie theater.

The environment in which the projector and screen are utilized may have an effect on the visual quality of the image that is displayed on the screen. For example, one measure of the visual quality of a projected image is contrast ratio. Contrast ratio is the ratio of the brightness of a white pixel, i.e. picture element, to the brightness of a black pixel. Because a typical projection screen may be highly reflective to reflect light from a projector, a black pixel is generally as white as the ambient lighting in the environment that includes the projection screen. To maximize contrast ratio, projectors may use bright light sources to make white pixels much brighter than ambient light. This, however, is costly to the projectors in terms of power, size and heat dissipation. Further, this cost is increased by the amount and type of ambient light that is encountered by a projector for use in the environment. For instance, as the amount of ambient light increases in an environment, a projector which is configured for the environment may include a higher-powered light source, which may increase both the size and the cost of the projector.

Therefore, it would be an advance in the art to provide an improved projection screen that may provide improved contrast of an image projected from a projector.

BRIEF DESCRIPTION OF THE DRAWINGS

The same reference numbers are used throughout the drawings to reference like features and components.

DETAILED DESCRIPTION

Overview

A projection screen for use in a projection system is described. The projector, for example, may project light in ranges of wavelengths, such as ranges of red, green and blue light. The projection screen may be coated with filters, dyes, pigments and/or other coatings that are absorptive in all visible wavelengths of light except those employed by the projector, i.e. the ranges of red, green and blue light. The projection screen is substantially darker when illuminated by broad spectrum light, but only marginally darker when illuminated by the projector in the ranges of wavelengths that are output by the projector. Thus, the projection screen provides improved contrast ratios.

In an embodiment of the present invention, a projection system includes a projector and a projection screen. The projector is configured to project an image composed of visible light in one or more ranges of wavelengths. The projection screen has a plurality of sub-pixels that reflect and/or transmit the one or more ranges of wavelengths to display the image and absorb visible wavelengths of light in at least one other range that is not included in the one or more ranges. One or more spaces are defined between adjacent sub-pixels that reflect and/or transmit the one or more ranges and the at least one other range.

In another embodiment of the present invention, a projection screen includes a substrate having a plurality of sub-pixels that are formed from one or more absorption materials. The absorption materials reflect and/or transmit visible light in one or more ranges of wavelengths and absorb visible light in at least one other range of wavelengths that is not included in the one or more ranges. The plurality of sub-pixels define one or more spaces between adjacent sub-pixels that reflect and/or transmit visible light in the one or more ranges and the at least one other range. The visible light that is reflected and/or transmitted provides an image projected from a projector and having wavelengths of light in the one or more ranges.

FIGS. 1-3, and 8-9 illustrate exemplary embodiments of projection screens. The projection screens in each embodiment of the present invention may be configured in a variety of ways, such as for use in a home theater for display of a television program, for use in an office to display a slide-show presentation, for use in a movie theater, for use in a rear-projection mode, and so on.

Figure 1:
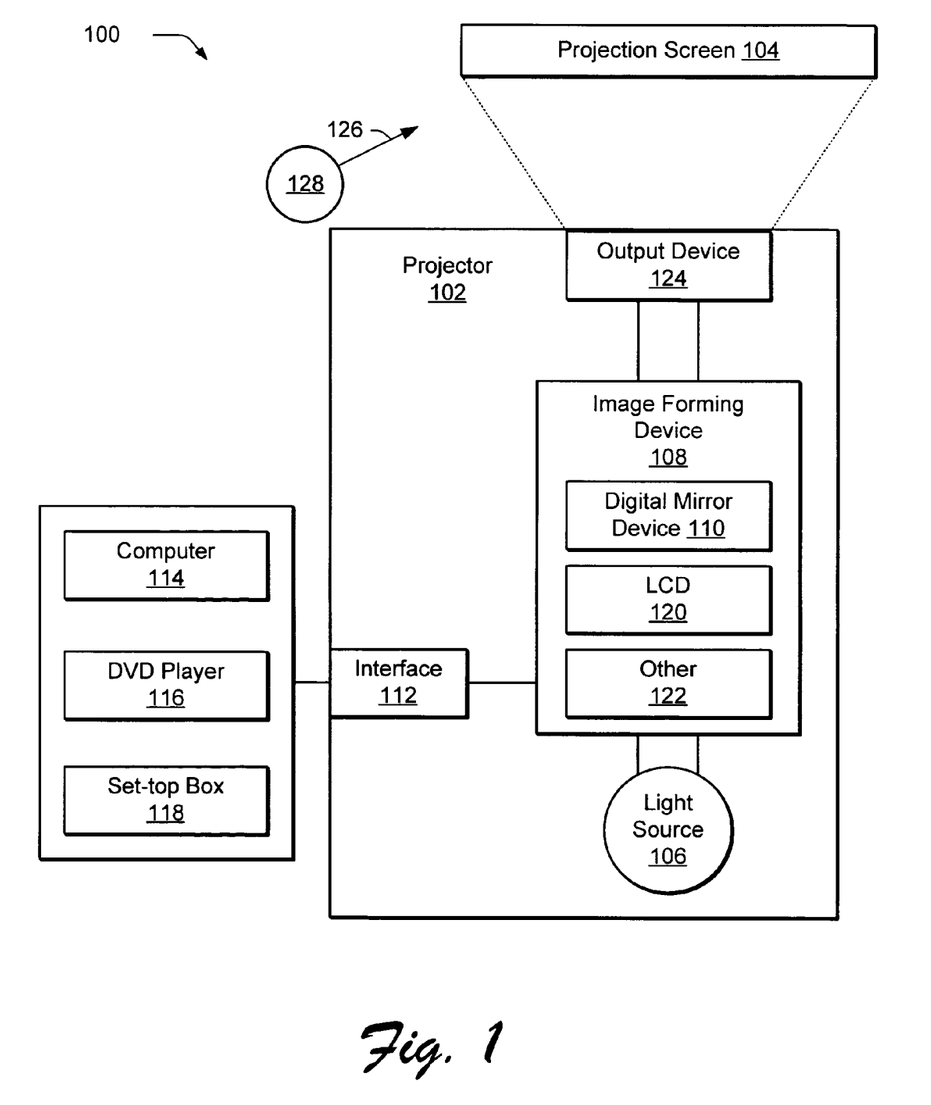
FIG. 1 is an illustration of an exemplary embodiment of the present invention that shows a projection system that includes a projector that provides an output for display on a projection screen.

FIG. 1 is an illustration of an exemplary embodiment of the present invention that shows a projection system 100 that includes a projector 102 that provides an output for display on a projection screen 104. The projector 102 includes a light source 106 that supplies light that is used to provide the output of the projector 102. The light source 106 may be configured in a variety of ways, such as an arc halogen discharge lamp. Arc halogen discharge lamps do not contain a filament to emit light but rather ionize a gaseous vapor though a high-energy arc discharge between two electrodes. Other light sources may also be utilized, such as incandescent light bulbs, fluorescent devices, light emitting diodes, lasers, and so forth.

Light from the light source 106 is directed toward an image forming device 108. The image forming device 108 provides an image using the light from the light source 106. To provide the image, the image forming device 108 may include a variety of components. In one embodiment, the image forming device 108 is configured to perform digital light processing through the use of a digital mirror device 110. The digital mirror device 110 includes a plurality of mirrors that are mounted onto a substrate. The mirrors of the digital mirror device 110 may be rotated individually, which causes each of the mirrors to either reflect or not reflect light from the light source 106.

If a single digital mirror device 110 is utilized, red, green and blue (RGB) portions of an image are shown in sequence to supply a colored image. For example, a color wheel that has red, green and blue (RGB) arcuate segments may be utilized to supply the colors. The color wheel is placed between the light source 106 and the digital mirror device 110 and is spun to provide red, green or blue light, depending on which segment of the color wheel that is placed in a pathway of light that is output from the light source 106 to the digital mirror device 110. Configuration of the mirrors on the digital mirror device 110 is synchronized with the placement of the segments of the color wheel in the light path to provide sequential red, green and blue images. By supplying the sequential images in rapid sequence, a full color image is perceived by the human eye. In another embodiment, multiple digital mirror devices are utilized to form an image. For example, separate digital mirror devices may be utilized to provide respective outputs of red, green and blue light. Light reflected from each of the separate digital mirror devices is combined to display a full color image.

The mirrors of the digital mirror device 110 may be configured in response to an input received from an interface 112. The input may be supplied to the interface 112 from a variety of devices, such as through a computer 114, a DVD player 116, a set-top box 118, and so forth. For example, the computer 114 may provide an input that causes a slide show to be displayed by the image forming device 110.

In another embodiment of the present invention, the image forming device 108 is configured to include a liquid-crystal display (LCD) 120. For example, the LCD 120 may include a stationary mirror. Light from the light source 106 is transmitted through the LCD 120 and reflected from the stationary mirror to provide an image. The LCD 120 is utilized to control the light reflected from the stationary mirror by controlling transmission of red, green and/or blue light at each pixel of the LCD 120. Like the mirrors of the digital mirror device 110, each pixel of the LCD 120 may be configured in response to input received from the interface 112. Although an image forming device 108 including a digital mirror device 110 and/or an LCD 120 is described, other components 122 may also be utilized in the image forming device 108 to form an image, such as a grating light valve (GLV) or a liquid crystal on silicon (LCOS) device. Although the illustrated projector 102 shows a separate image forming device 108 and a separate light source 106, components may be added, combined and/or deleted in various embodiments.

Light that is transmitted by the image forming device 108 is output using an output device 124, such as a lens, one or more mirrors, and so on. Light output by the output device 124 is then displayed on the projection screen 104 for viewing. To increase the image quality of the display on the projection screen 104, the projection screen 104 may be configured to match the output of the projector 102. For example, the projection screen 104 may employ optical filtering to reduce the amount of ambient light 126 output by an ambient light source 128 that is reflected by the projection screen 104.

Figure 2:
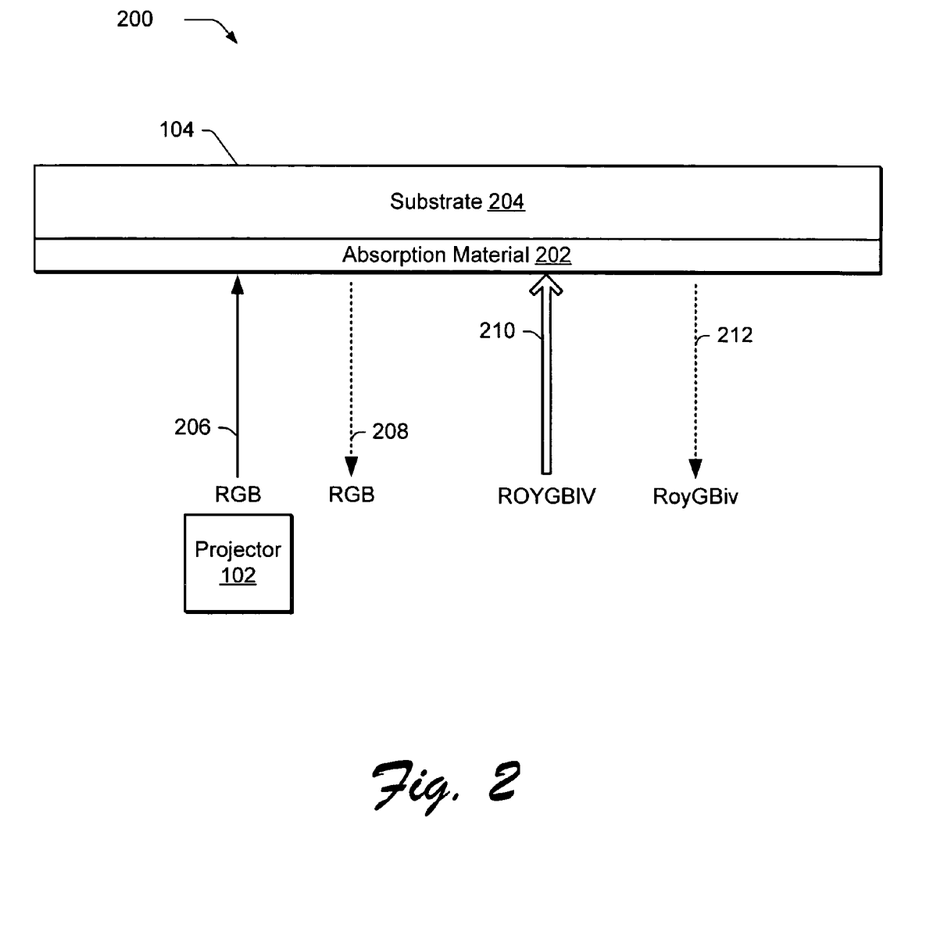
FIG. 2 is an illustration of an exemplary embodiment of the present invention showing the projection screen of FIG. 1 in greater detail.

FIG. 2 is an illustration of an exemplary embodiment 200 of the present invention showing the projection screen 104 of FIG. 1 in greater detail. As previously stated, a measure of visual quality of a projected image is contrast ratio. Contrast ratio of the projection screen 104 may be affected by ambient light in an environment that includes the projection screen 104. To reduce the effect of ambient light on a display of the output from the projector 102 on the projection screen 104, the projection screen 104 utilizes optical filtering to reduce the amount of ambient light, e.g. light that is not output by the projector 102 of FIG. 1, which is reflected by the projection screen 104.

The projection screen 104, for example, may employ an absorption material 202 on a substrate 204 of the projection screen 104 that reflects the output from the projector 104 and absorbs ambient light. Absorption is an optical property that describes a fraction of light waves that are lost through absorption of photons by atoms in a material. Absorption is a function of a path length "L" through the material and the absorption coefficient "α" of the material. Absorption is represented by a ratio of the amount of light "I" that passes through the material to the amount of light "$I_o$–R" entering the material. $I_o$ is the amount of light incident on the material surface. R is the amount of light reflected from the surface. Absorption may be represented as follows:

$$\frac{I}{I_O - R} = e^{-\alpha L}$$

If a light wave of a given wavelength strikes a material with electrons that correspond to the wavelength, e.g. have the same frequency of vibration as the frequency of the light wave, the electrons of the material will absorb the energy of the light wave and transform it into vibrational motion. The vibration of the electrons causes an interaction with neighboring electrons such that the vibrational energy is converted into thermal energy. Thus, a light wave is absorbed which has a frequency that matches the vibrational frequency of the electrons of the material. In this way, a material with a selective absorption may be provided which absorbs particular wavelengths of light. By selecting one or more materials having selective absorption for inclusion on the projection screen 104, the projection screen 104 may be configured to reflect light that is output by the projector 102 and to absorb ambient light, i.e. light that is not output by the projector 102. The absorption materials may include a pigment, optical coating, optical dye, filter, and so on.

The projector 102 provides an output of light 206 that is composed of red, green and blue light, which is represented by "RGB" in FIG. 2. Red, green and blue light is utilized by the projector 102 through an additive color technique to provide a full color image. The additive color technique mixes various amounts of red, green and blue light, i.e. primary colors, to produce other colors. For example, by combining two primary colors, secondary colors of cyan, magenta or yellow may be produced. By combining all three primary colors, a display of white is produced. The absence of all three primary colors is utilized to produce a black display.

A variety of techniques may be employed by the projector 102 to provide a full-color image utilizing the RGB additive color technique. For example, separate red, green and blue portions of an image may be output in rapid sequence such that a full color image is perceived by the human eye. In another embodiment, red, green and blue portions of an image are output concurrently to supply a full-color image. In a further embodiment, the projector 102 includes the LCD 120 of FIG. 1. Pixels of the LCD provide red, green and blue light. The human eye views colors that are formed by the mixture of light provided by the pixels as a whole. Therefore, a full color image may be formed from pixels that provide colors that are produced from the mixture of red, green and/or blue light.

The projection screen 104, in this embodiment, is configured to provide reflected light 208 from the light 206 that was output by the projector 102 on the projection screen 104, i.e. incident light. The reflected light 208 includes the red, green and blue light, which is illustrated in FIG. 2 by the letters "RGB". The letters "RGB" are shown as capital letters for the reflected light 208 that match the capital letters "RGB" for the light 206 to signify that a substantial portion of the light 206 output by the projector 102 was reflected by the projection screen 104 to provide reflected light 208.

The absorption material 202 of the projection screen 104 is utilized to absorb wavelengths of light that are not output by the projector 102. For instance, sunlight 210 may be provided which includes each of the wavelengths of visible light. For purposes of the present discussion, the wavelengths of visible light will be described as a range of wavelengths of red, orange, yellow, green, blue, indigo and violet visible light, which are illustrated in FIG. 2 by the letters "ROYGBIV". The absorption material 202 absorbs wavelengths of light that are not output by the projector 102, which in this embodiment are orange, yellow, indigo and violet wavelengths of light. Therefore, the amount of orange, yellow, indigo and violet wavelengths of light that is included in reflected sunlight 212 is reduced by the absorption material 202. The red, green and blue wavelengths of visible light are not absorbed by the absorption material 202, but rather are reflected by the projection screen 104 in a manner similar to the reflection provided by the projection screen 104 for the output of the projector 102. Therefore, the reflected sunlight 212 includes a substantial portion of the red, green and blue wavelengths of the sunlight 210. A substantial portion of the orange, yellow, indigo and violet wavelengths of the sunlight 210 was removed through absorption by the absorption material 202. This is illustrated in FIG. 2 by the use of corresponding capital and lower case letters to denote the intensity of light in the respective ranges, which for the reflected sunlight 212 is illustrated as "RoyGBiv".

Although reflection of a substantial portion of light by the projection screen 104 has been described, the substantial portion described may vary depending on the reflectivity of the projection screen 104. For example, the projection screen 104 may have an eighteen percent reflectivity or red, green and blue light and a 5 percent reflectivity of orange, yellow, indigo and violet light. Therefore, the projection screen 104 in this example reflects a substantial portion of red, green and blue light with respect to the amount of light of orange, yellow, indigo and violet light reflected by the projection screen 104.

Figure 3:
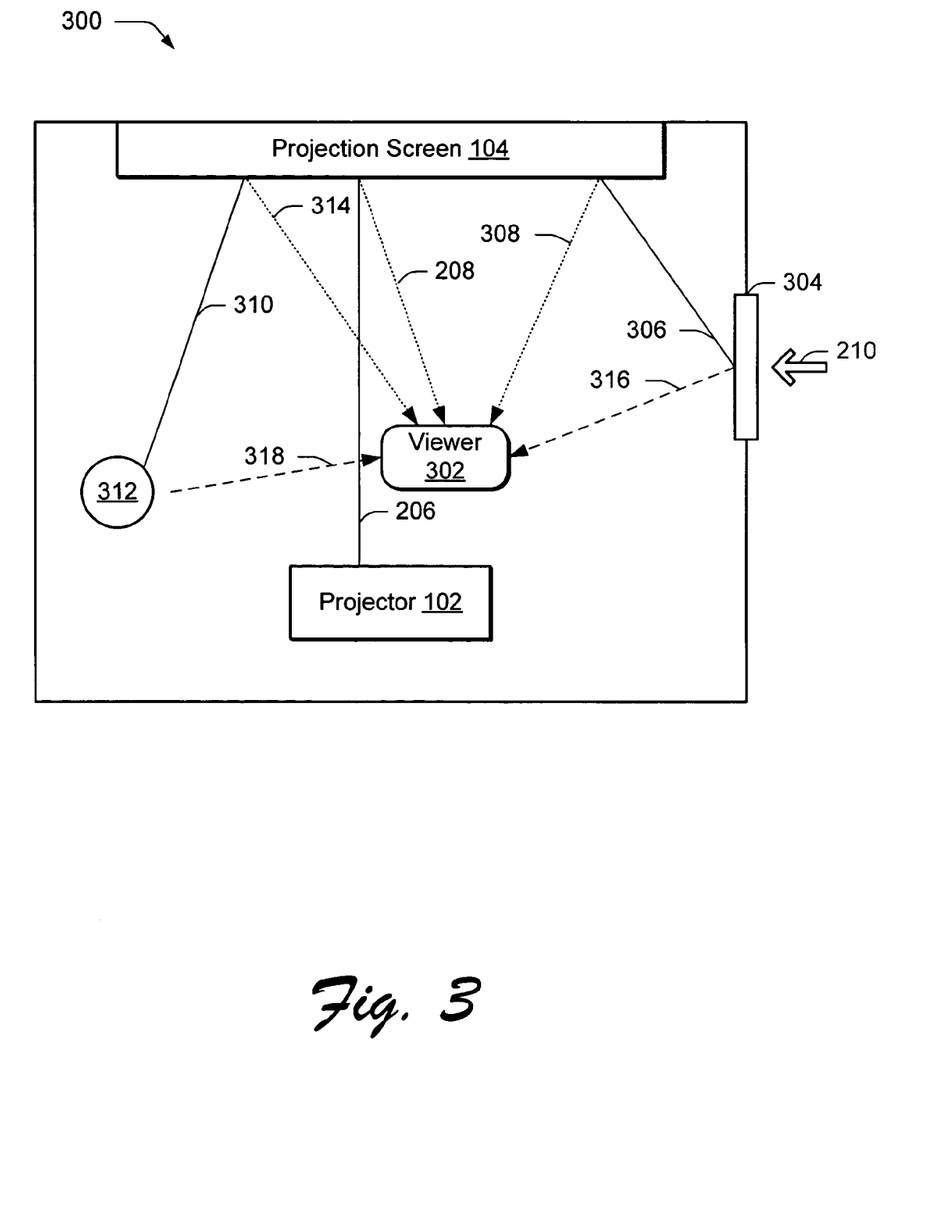
FIG. 3 is an illustration of an exemplary embodiment of the present invention showing an environment that includes the projector of FIG. 1 and the projection screen of FIG. 2.

FIG. 3 is an illustration of an exemplary embodiment of the present invention showing an environment 300 that includes the projector 102 and the projection screen 104 of FIG. 2. The projector 102 in this embodiment is illustrated as a front-projection projector that that outputs light 206 that forms an image that is reflected by the projection screen 104 as reflected light 208. A viewer 302 views the reflected light 208 to watch the output provided by the projector 102. For example, the light 206 that is output by the projector 102 may include a series of still images that provide a moving scene of a movie. The series of still images are reflected by the projection screen 104 such that the moving scene may be watched by the viewer 302.

Ambient light may be provided from a variety of light sources. For example, a window 304 transmits light 306 that is a portion of the sunlight 210 that strikes the window 304. A portion of the transmitted light 306 is reflected by the projection screen 104 such that reflected light 308 is directed at the viewer 302. Additionally, light 310 that is output by a lamp 312 may be reflected by the projection screen 104 such that reflected light 314 is directed at the viewer 302. The projection screen 104 absorbs a substantial portion of light 310 that is output by the lamp 312 and the light 306 that is transmitted by the window 304 such that contrast ratio of an image is preserved that is projected on the projection screen 104 by the projector 102. Further, by providing absorption of the ambient light by the projection screen 104, increased amounts of ambient light may be utilized in the environment 300 that includes the projection screen 104 and the projector 102. Therefore, the viewer 302 may be provided with light 316, 318 from the window 304 and lamp 312, respectively. In this way, the viewer 302 is provided with an image from the projection 102 that is displayed on the projection screen 104 in a well-lit environment that preserves the contrast ratio of the image.

Figure 4:
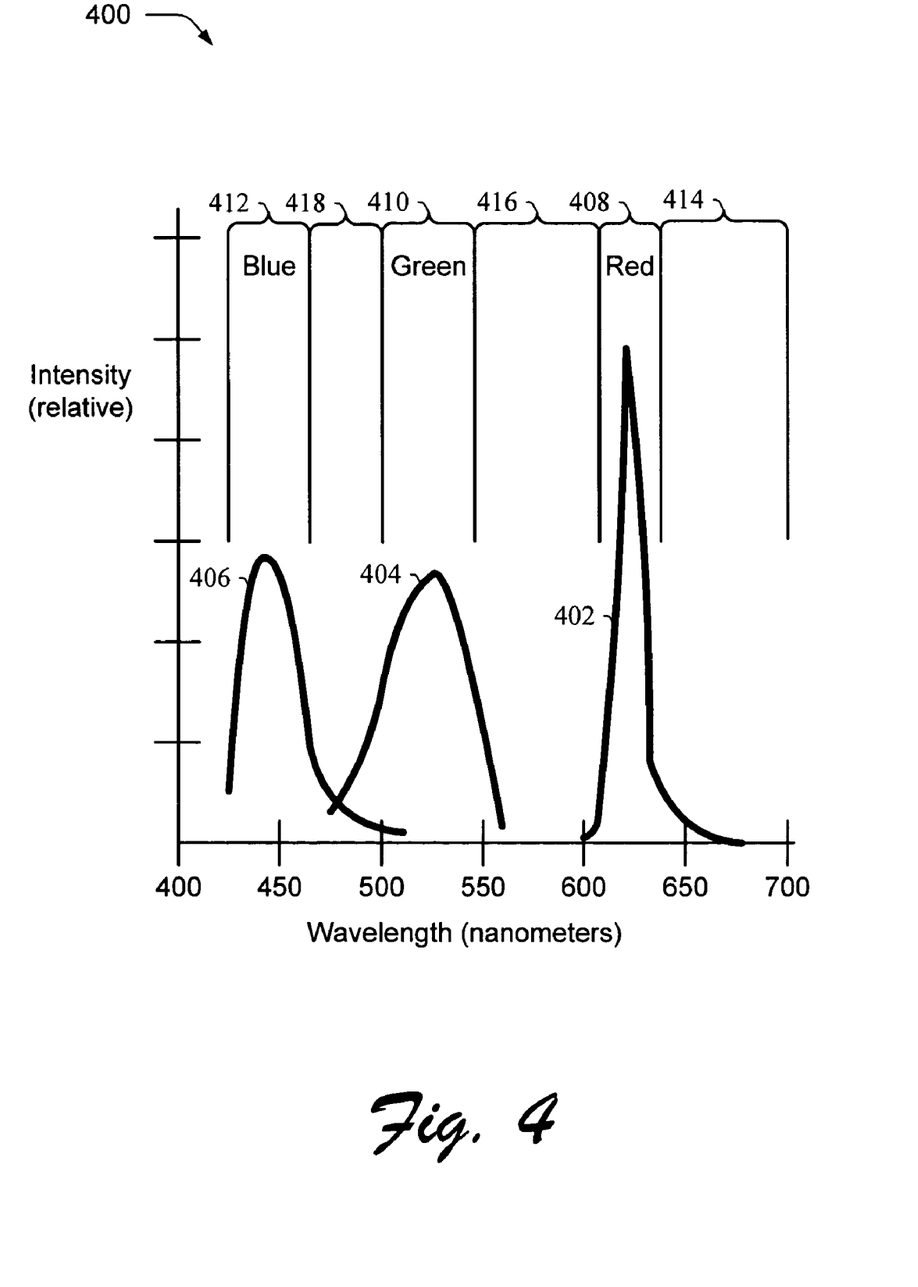
FIG. 4 is an illustration showing light that is output by the projector of FIG. 2 plotted on a graph having a first axis that plots the wavelength of visible light and a second axis that plots the relative intensity of visible light.

FIG. 4 is an illustration showing ranges of wavelengths of light that are output by the projector 102 of FIG. 2 plotted on a graph 400 having a first axis that describes wavelengths of visible light and a second axis that describes intensity of visible light. As previously described, the projector 102 of FIG. 2 outputs red, green and blue light 402, 404, 406 to form a full color image when viewed by the human eye. The red light 402 is composed of a first range 408 of wavelengths of visible light in the red part of the visible spectrum. The green light 404, which is output by the projector 102 of FIG. 2, is composed of a second range 410 of wavelengths of visible light in the green part of the visible spectrum. Likewise, the blue light 406 is composed of a third range 412 of wavelengths of visible light in the blue part of the visible spectrum. The projection screen 104 of FIG. 2 is configured to absorb wavelengths of light that are not output by the projector 102. For example, the absorption material 202 of the projection screen 104 of FIG. 2 may absorb ranges 414, 416, 418 of wavelengths of light that are not included in the first, second and third ranges 408-412.

Although light that is output by the projector 102 has been described as having ranges of red, green and blue wavelengths, a variety of ranges of wavelengths of light may be utilized. In an embodiment, the projector 102 of FIG. 2 may output primary and secondary colors to provide greater color depth to a projected image. For instance, the projector may output the primary colors of red, green and blue light and secondary colors such as cyan, magenta and yellow. In another embodiment, the projector 102 of FIG. 2 may output a single range of wavelengths of light to provide a monochromatic image when displayed on the projection screen 104.

Figure 5:
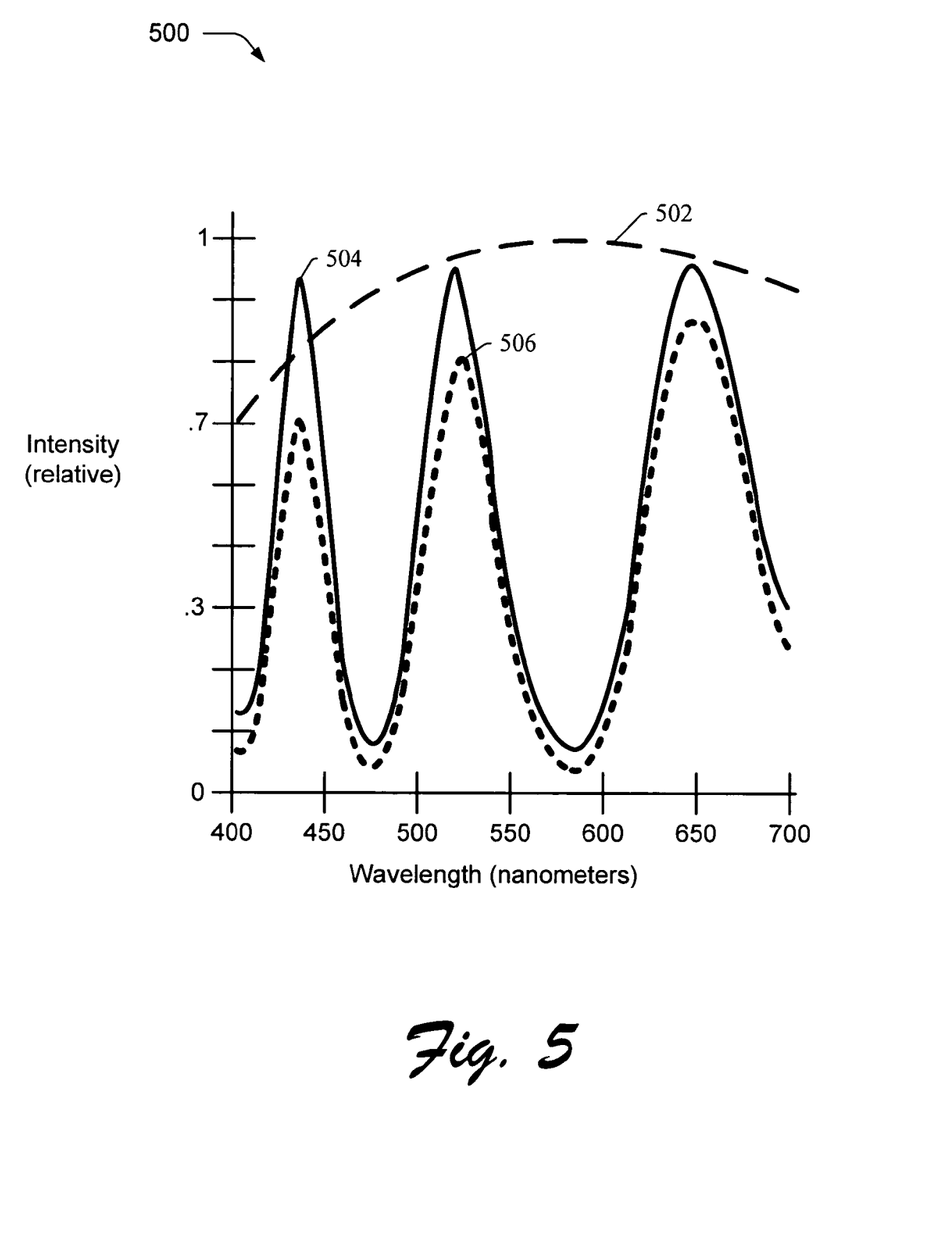
FIG. 5 is an illustration of a graph showing spectra of an ambient light source of an output from the ambient light source and reflected light from a projection screen.

FIG. 5 is an illustration of a graph 500 showing spectra of an output from the ambient light source and reflected light from the projection screen 104. In the illustrated graph 500, the output of the ambient light source has a color temperature of 5000 K. Color temperature is a hue or wavelength expressed as hypothetical wavelengths emitted by an ideal blackbody having an absolute temperature of "n" Kelvin's (n K). Color temperatures having higher numbers indicate hues in or toward the blue portion of the visible spectrum, while lower numbers indicate hues in or toward the red portion of the visible spectrum. Examples of color temperatures include approximately 5000 K to 5500 K for sunlight, approximately 4100 K for fluorescent lighting, and approximately 2800 K for incandescent lighting.

The output of the ambient light source is plotted as a line 502 that depicts the relative intensity of the ambient light source plotted at each wavelength of visible light. The reflectivity of the projection screen 104 is plotted as a line 504 for each wavelength of visible light. The line 504 illustrates that the projection screen 104 reflects light in a first range of 40 nm which is centered at 440 nm, a second range of 50 nm which is centered at 525 nm, and a third range of 80 nm which is centered at 650 nm. As previously described, the first, second and third ranges may correspond to an output from a projector that is provided to display an image on the projection screen 104. The projection screen 104 in this embodiment substantially absorbs all other wavelengths of visible light that are not in the first, second and third ranges. Light reflected by the projection screen is illustrated by line 506. The differences between the intensity of line 502 and line 506, respectively, illustrate the absorption of ranges of wavelengths of light that are not included in the first, second and third ranges by the projection screen 104. Thus, the amount of ambient light that is reflected by the projection screen is reduced. By reducing the amount of reflected ambient light, the projection screen 104 improves contrast for conditions with ambient lighting.

Figure 6:
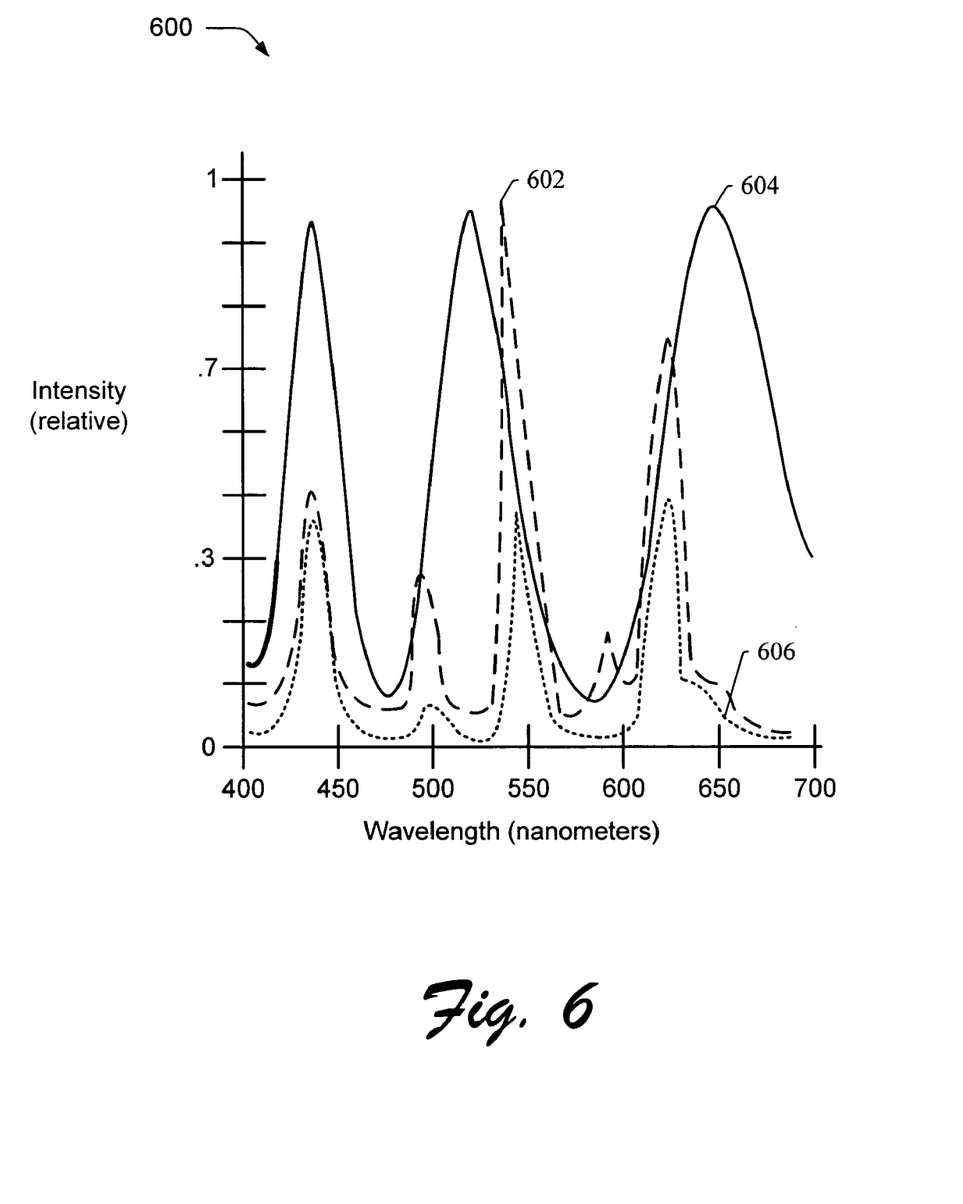
FIG. 6 is an illustration of a graph showing spectra of an output and reflected light from an ambient light source that is configured as a fluorescent light source.

FIG. 6 is an illustration of a graph 600 showing spectra of an output and reflected light from an ambient light source that is configured as a fluorescent light source. In the previous embodiment, spectra for sunlight were shown. Sunlight has a substantially uniform intensity at each wavelength of the visible spectrum. Ambient light may also be provided which does not have a uniform intensity at each wavelength of visible light. Fluorescent light, for example, may have a plurality of wavelength peaks in the visible spectrum, an example of which is illustrated by line 602. The absorption of the projection screen, plotted as line 604, may be configured to improve contrast for even non-uniform ambient light. The light reflected by the projection screen in this embodiment is plotted as line 606. The difference in intensity between line 602 and line 606, respectively, illustrate the absorption of ranges of wavelengths of light and thus a decrease in the amount of light which is reflected by the projection screen 104. By reducing the amount of reflected ambient light, the projection screen 104 improves contrast for conditions with ambient lighting even in instances in which light that is output by an ambient light source is not uniform.

Figure 7:
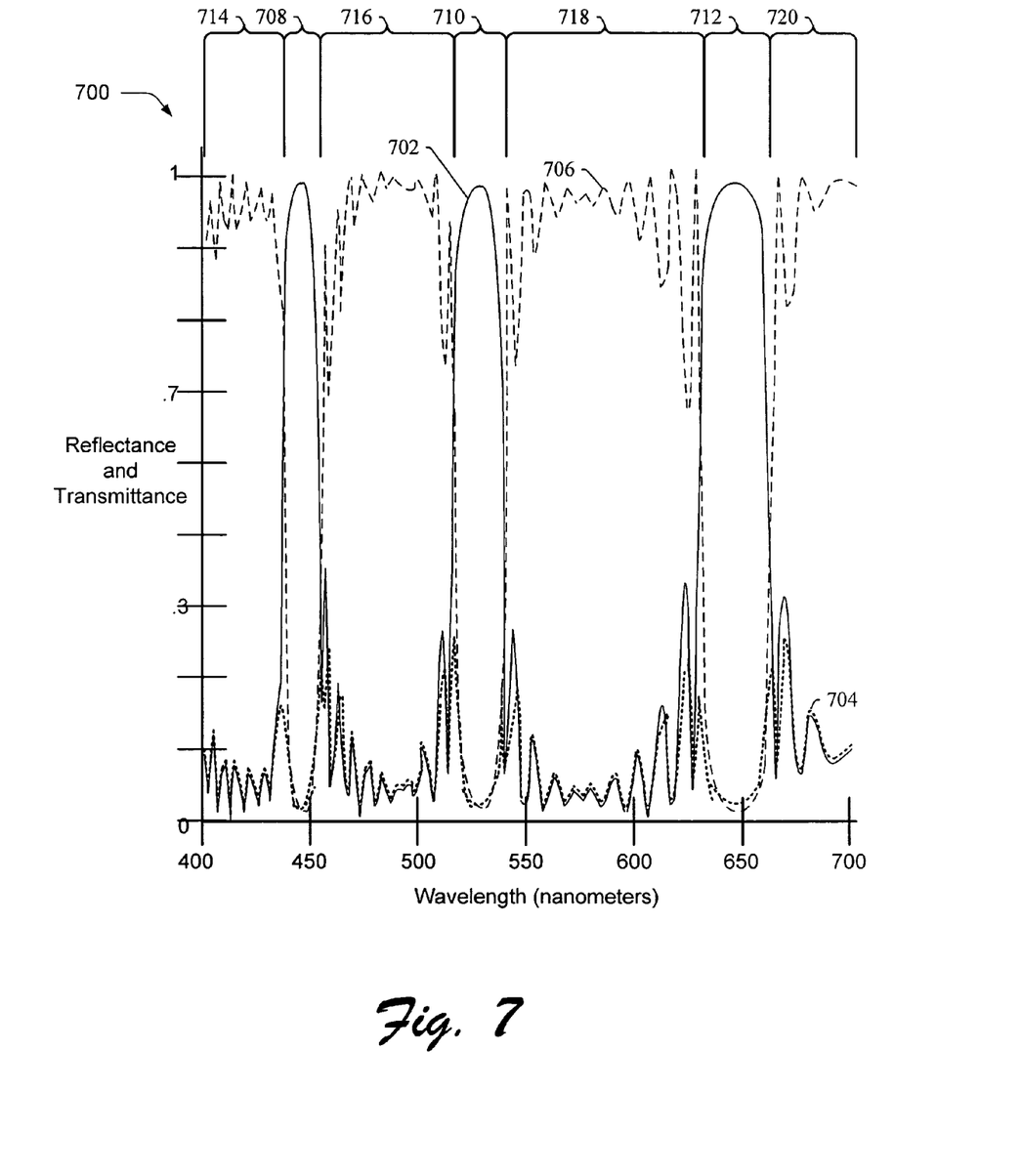
FIG. 7 is an illustration of a graph showing spectra of reflectance by a projection screen, transmittance of absorption material, and the product of reflectance and transmittance of the absorption material.

FIG. 7 is an illustration of a graph 700 showing spectra of reflectance by the projection screen, transmittance of absorption material, and the product of screen reflectance and transmittance of the absorption material. By decreasing the size of the ranges of wavelengths of light output by a projector, the projection screen may provide improved contrast by matching the ranges. The range of wavelengths may be specified through spectral width. Spectral width may be defined, for instance, as a range of wavelengths over which the magnitude of all spectral components is equal to or greater than a specified fraction of the magnitude of the wavelength having the maximum intensity. For example, spectral width may be specified as a full width of the portion of the visible spectrum at half the maximum intensity of light. Examples of light emitting devices and corresponding spectral widths include laser diodes, which may have a spectral width of several nanometers (e.g., 5 nanometers or less), and light emitting diodes, which in various embodiments have spectral widths of approximately 100 nanometers or less and approximately 35 nanometers or less.

Line 702, which is illustrated as a solid line in FIG. 7, is plotted for reflectance by the projection screen 104. Line 704, which is illustrated by a long-dashed line in FIG. 7, is plotted for transmittance of absorption material 202 of the projection screen 104. Line 706, which is illustrated by a short-dashed line in FIG. 7, is plotted for the product of screen reflectance and transmittance of the absorption material 202. As shown by line 702, the projection screen 104 reflects light in first, second and third ranges of wavelengths 708, 710, 712 having narrow spectral widths, e.g. 35 nanometers or less.

Ranges of wavelengths 714, 716, 718, 720 that are not included in the first, second and third ranges 708-712 are absorbed by the projection screen 104. By providing narrow ranges for reflectance of light, the ranges of wavelengths 714, 716, 718, 720 may be larger, i.e. include more wavelengths of visible light, thereby absorbing a greater portion of the ambient light. In this way, increasingly lower intensities of light may be output by the projector to provide an image on the projection screen 104 as the spectral width of the ranges of the projected light by the projector 102 decreases. For example, in one embodiment, the projection screen 104 reduces reflected ambient light by 3 to 12 times. The reduction in reflected ambient light enables a light source in the projector 102 of FIG. 1 to be an order of magnitude dimmer and provide equivalent contrast to a projection screen that does not provide the reduction in reflected ambient light. Therefore, the projector 102 of FIG. 1 may utilize less power, may be configured with smaller light sources 106, and may be configured in an overall smaller size thereby increasing the portability of the projector 102.

Figure 8:
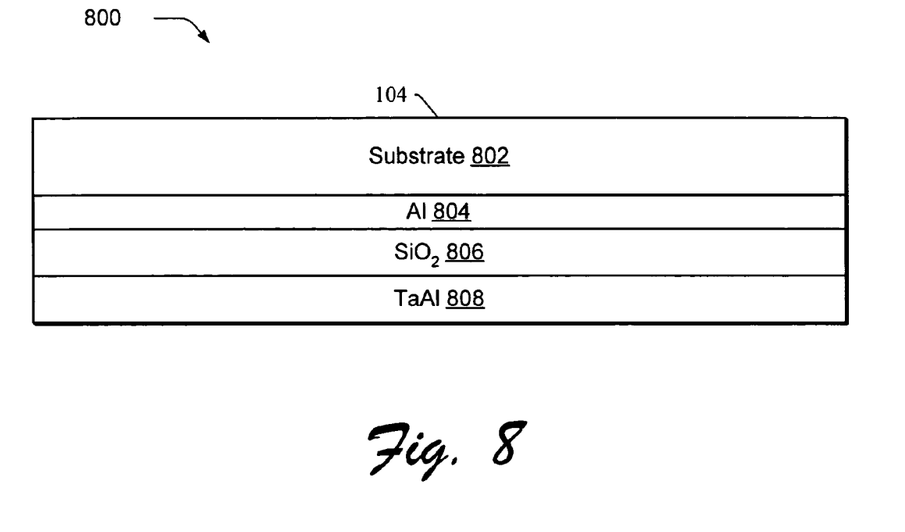
FIG. 8 is an illustration of an exemplary embodiment of the present invention showing a projection screen.

FIG. 8 is an illustration of an exemplary embodiment 800 of the present invention showing the projection screen 104 in greater detail. The projection screen 104 may be produced in a variety of ways. For example, layers of aluminum 804, silicon dioxide 806 and TaAl 808 may be provided in three depositions on an initial substrate, such as a substrate 802 of silicon. The thin film stack of the layers of aluminum 804, silicon dioxide 806 and TaAl 808 are then released from the substrate 802 and broken into particles. The particles are then applied to a flexible substrate to provide the absorption material 202 of the projection screen as previously discussed in relation to FIG. 2. The initial substrate 802 of silicon may be re-used to form absorption materials for application to additional flexible substrates.

A variety of substrates may be utilized with absorption material to provide the projection screen 104. For example, a substrate may be configured to be reflective, transparent, rigid, flexible, and so on. Additionally, although three-layers have been discussed, a variety of layers and materials may be employed to provide selective absorption of wavelengths of light that are not to be reflected by the projection screen 104, i.e. wavelengths of light that correspond to the wavelengths of light output by a projector.

Figure 9:
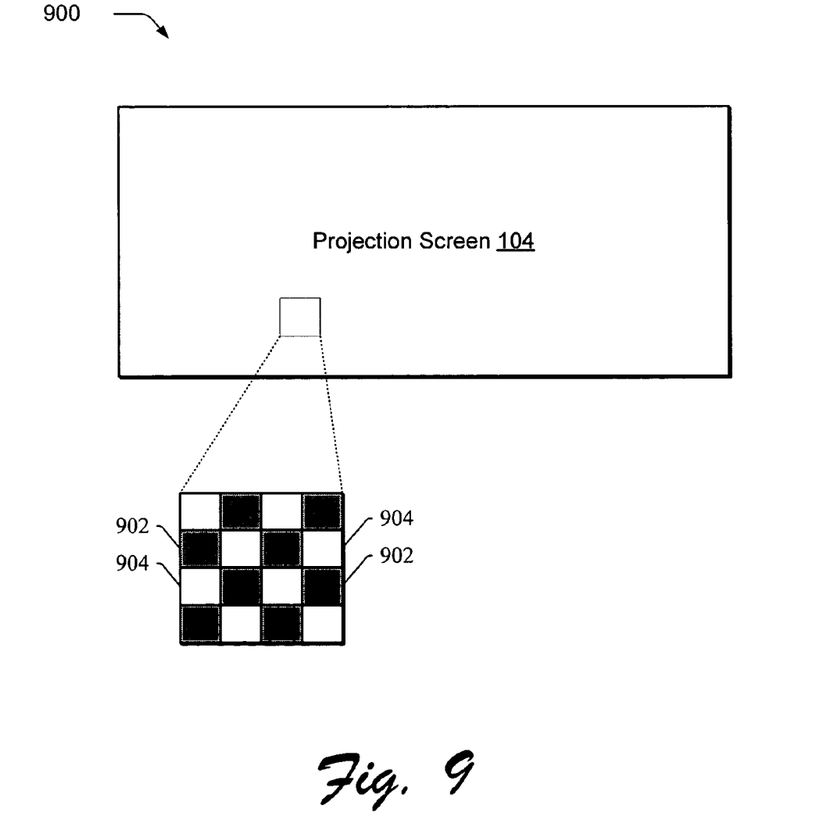
FIG. 9 is an illustration of an exemplary embodiment of the present invention showing the projection screen of FIG. 8 having a patterned absorption material.

FIG. 9 is an illustration of an exemplary embodiment 900 of the present invention showing the projection screen 104 having a patterned absorption material. In the previous embodiments, the projection screen 104 was described as having a substantially uniform coating of absorption material to absorb wavelengths of light that are not output by the projector 102. In an additional embodiment, the projection screen 104 may be configured to include a plurality of sub-pixels 902 formed of absorption material, which are illustrated in FIG. 9 by the shaded boxes. The plurality of sub-pixels 902, for example, may be formed to be smaller than a projected pixel from the projector 102. The plurality of sub-pixels 902 may be formed in a variety of ways, such as by utilizing inkjet technology. For example, each of the plurality of sub-pixels 902 may be formed on a substrate though expulsion of absorption material from an ink jet nozzle. The projection screen 104 may reflect with an incidence of light that is output by the projector 102 and absorb wavelengths of light with an incidence of light from ambient light sources.

The plurality of sub-pixels 902 define one or more spaces 904 between adjacent sub-pixels that may reflect and/or transmit light in the one or more ranges that are output by the projector and the at least one other range that is absorbed by the plurality of sub-pixels 902. In this way, the plurality of sub-pixels 902 may be formed of absorption materials having greater absorptions yet still provide a bright projected image. For example, the absorption materials used to form the plurality of sub-pixels 902 may have limited reflectance. Therefore, the plurality of sub-pixels 902 may be disposed on a substrate to absorb ambient light and reflect projected light, and spaces 904 may be defined between the plurality of sub-pixels 902 that reflect both ambient and projected light. It should be apparent that the plurality of sub-pixels 902 may assume a variety of shapes, such as square as illustrated in FIG. 9, irregular shapes, circular shapes, and so on.

Although the projection screen 104 has been illustrated in front-projector environments, the projection screen 104 may be configured in a variety of ways. For example, in a rear-projection mode the substrate 802 transmits light that is output by the projector 102 to be watched by the viewer. In other words, the projection screen 104 is positioned between viewer and the projector 102, as opposed to a front-projection system where the projector 102 and the viewer are positioned on the same side of the projection screen 104.

Figure 10:
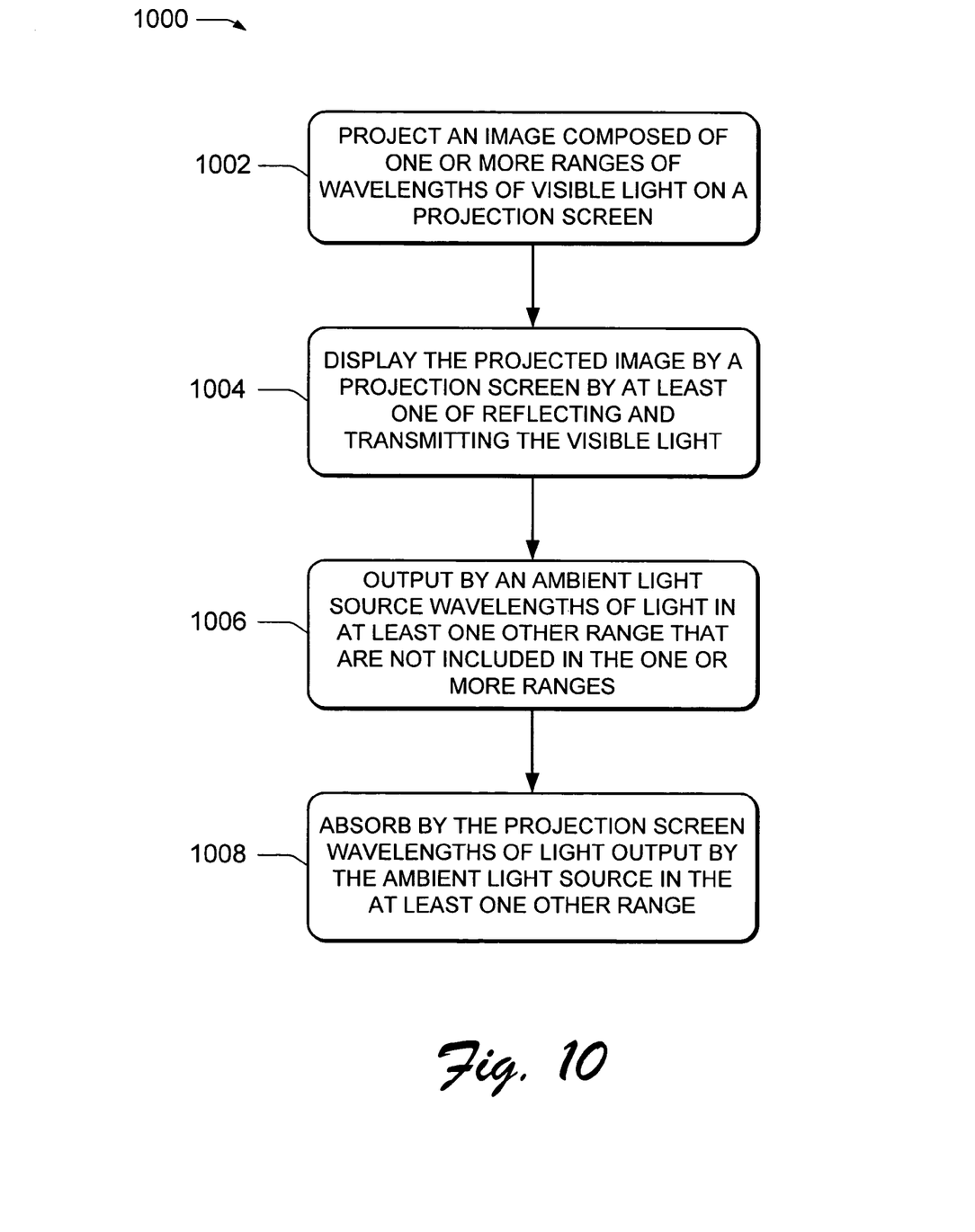
FIG. 10 is a flow chart depicting a procedure of an exemplary embodiment of the present invention wherein a projection screen displays an image projected by a projector.

FIG. 10 is a flow chart depicting a procedure 1000 of an exemplary embodiment of the present invention wherein the projection screen displays an image projected by the projector. At block 1002, an image is projected on the projection screen by the projector. The image is composed of one or more ranges of wavelengths of light. For example, the image may be composed of narrow ranges, i.e. spectral widths of 35 nanometers or less, of wavelengths of red, green and blue light.

At block 1004, the projected image is displayed on the projection screen by reflecting and/or transmitting the visible light. The projection screen, for instance, may include a reflective substrate that reflects the projected image to be watched by a viewer. In another embodiment, the projection screen may transmit the projected image, such as in a rear projection mode.

At block 1006, an ambient light sources outputs wavelengths of light in at least one other range of wavelengths that are not included in the one or more ranges. The ambient light source, for instance, may output light in range of wavelengths that are not output by the projector. At block 1008, the projection screen absorbs visible wavelengths of light in at least one other range of wavelengths that is not included in the one or more ranges of wavelengths of light. Thus, the projection screen may absorb wavelengths of light that do not correspond to wavelengths of light that are output by the projector.

Figure 11:
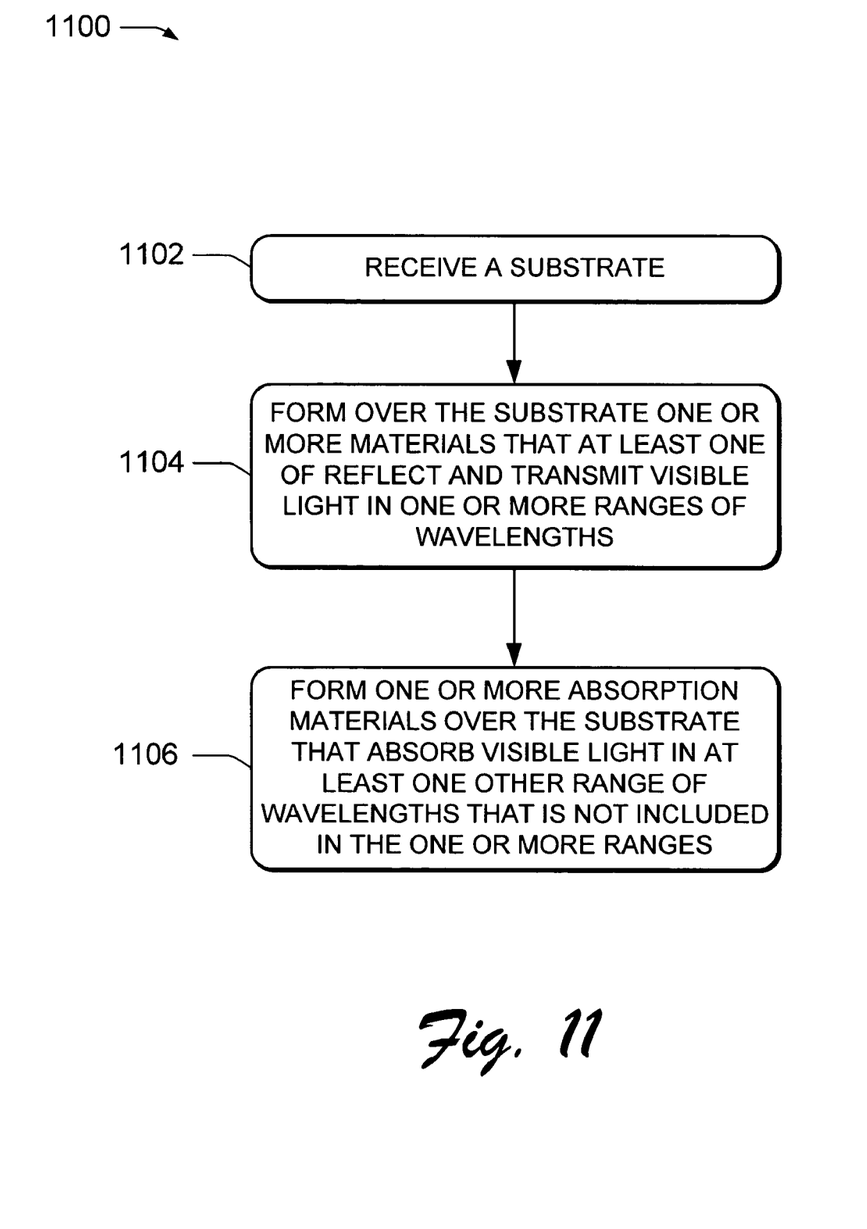
FIG. 11 is a flow chart depicting a procedure of an exemplary embodiment of the present invention wherein a projection screen is produced.

FIG. 11 is a flow chart depicting a procedure 1100 of an exemplary embodiment of the present invention wherein a projection screen is produced. At block 1102, a substrate is received. The substrate may be configured in a variety of ways, such as to be rigid, flexible, reflective, absorptive, transmissive and the like. At block 1104, one or more materials are formed on the substrate. The one or more materials reflect and/or transmit visible light in one or more ranges of wavelengths of visible light. The one or more materials may be formed on the substrate in a variety of ways, such as through deposition, formed as a film that is applied to the substrate, and so on.

At block 1106, one or more absorption materials are formed on the substrate that absorb visible light in at least one other range of wavelengths that is not included in the one or more ranges of wavelengths. The visible light that is reflected and/or transmitted provides an image projected from a projector having wavelengths of light in the one or more ranges. Thus, a projection screen is provided in which the one or more absorption materials absorb wavelengths of light that are not output by the projector. The one or more absorption materials may be formed on the substrate before the one or more materials, with the one or more materials, and/or after formation of the one or more materials on the substrate.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A projection system comprising:
   a projector to project an image composed of visible light in one or more ranges of wavelengths; and
   a projection screen comprising a plurality of pixels, each pixel comprising:
      a plurality of sub-pixels that:
         at least one of reflect and transmit the one or more ranges of wavelengths to display the image; and
         absorb visible wavelengths of light in at least one other range that is not included in the one or more ranges; and
      one or more spaces defined between adjacent said sub-pixels that at least one of reflect and transmit the one or more ranges and the at least one other range.

2. A projection system as described in claim 1, wherein each said sub-pixel is smaller than a pixel projected on the projection screen by the projector.

3. A projection system as described in claim 1, wherein the one or more ranges include:

a range of red wavelengths of visible light;
a range of green wavelengths of visible light; and
a range of blue wavelengths of visible light.

4. A projection system as described in claim 1, wherein the projector does not project wavelengths of light in the at least one other range.

5. A projection system as described in claim 1, wherein the image is provided by an additive color technique so as to have a full-color appearance to the human eye.

6. A projection system as described in claim 1, wherein the plurality of sub-pixels absorb the visible wavelengths of light in the at least one other range by utilizing a material selected from the group consisting of:
an optical filter;
a pigment;
an optical coating;
an optical dye; and
any combination thereof.

7. A projection system as described in claim 1, wherein the projection screen includes a substrate that reflects or transmits visible light in the one or more ranges of wavelengths.

8. A projection system as described in claim 1, wherein the projector includes a component selected from the group consisting of:
a digital micromirror device (DMD);
a liquid crystal display (LCD);
a grating light valve (GLV); and
a liquid crystal on silicon (LCOS) device.

9. A projection system as described in claim 1, wherein each of the one or more ranges has a spectral width selected from the group consisting of:
approximately 100 nanometers or less;
approximately 35 nanometers or less; and
approximately 5 nanometers or less.

10. A projection screen comprising a substrate having thereon:
a plurality of pixels, each pixel comprising a plurality of sub-pixels formed from one or more absorption materials that:
at least one of reflect and transmit visible light in one or more ranges of wavelengths;
absorb visible light in at least one other range of wavelengths that is not included in the one or more ranges; and
define one or more spaces between adjacent said sub-pixels that at least one of reflect and transmit visible light in the one or more ranges and the at least one other range;
wherein the visible light that is at least one of reflected and transmitted provides an image projected from a projector and having wavelengths of light in the one or more ranges.

11. A projection screen as described in claim 10, wherein each said sub-pixel is smaller than a pixel projected by the projector.

12. A projection screen as described in claim 10, wherein the substrate reflects or transmits visible light in the one or more ranges of wavelengths.

13. A projection screen as described in claim 10, wherein the one or more ranges include:
a range of red wavelengths of visible light;
a range of green wavelengths of visible light; and
a range of blue wavelengths of visible light.

14. A projection screen as described in claim 10, wherein the image has a full-color appearance to the human eye.

15. A projection screen as described in claim 10, wherein the one or more absorption materials include a material selected from the group consisting of:
an optical filter;
a pigment;
an optical coating;
an optical dye; and
any combination thereof.

16. A projection screen as described in claim 10, wherein each of the one or more ranges has a spectral width selected from the group consisting of:
approximately 100 nanometers or less;
approximately 35 nanometers or less; and
approximately 5 nanometers or less.

17. A method comprising:
projecting by a projector an image composed of visible light in one or more ranges of wavelengths on a projection screen;
displaying the projected image by the projection screen by at least one of reflecting and transmitting the visible light;
receiving, by the projection screen, from an ambient light source, wavelengths of visible light in at least one other range not included in the one or more ranges; and
absorbing by the projection screen wavelengths of light received from the ambient light source in the at least one other range by elements defining a pattern on a substrate of the projection screen.

18. A method as described in claim 17, wherein the elements defined in the pattern comprise sub-pixels, and a plurality of sub-pixels comprise a pixel.

19. A method as described in claim 17, wherein the outputting further comprises outputting by the ambient light source visible wavelengths of light in the one or more ranges.

20. A method as described in claim 17, wherein the one or more ranges include:
a range of red wavelengths of visible light;
a range of green wavelengths of visible light; and
a range of blue wavelengths of visible light.

21. A method as described in claim 17, wherein each of the one or more ranges has a spectral width selected from the group consisting of:
approximately 100 nanometers or less;
approximately 35 nanometers or less; and
approximately 5 nanometers or less.

22. A method comprising:
forming over a substrate one or more materials that at least one of reflect and transmit visible light in one or more ranges of wavelengths; and
forming over the substrate one or more absorption materials that absorb visible light in at least one other range of wavelengths not included in the one or more ranges such that the one or more absorption materials are patterned over the substrate to form a plurality of regions,
wherein the visible light that is at least one of reflected and transmitted provides an image projected from a projector and having wavelengths of light in the one or more ranges.

23. A method as described in claim 22, wherein the forming over the substrate of the one or more absorption materials further comprises:
forming the one or more absorption materials over an initial substrate;
releasing the one or more absorption materials from the initial substrate; and applying the released one or more absorption materials to the substrate.

24. A method as described in claim 22, wherein the plurality of absorption materials are formed in layers that include at least one of aluminum, silicon dioxide and TaAl.

25. A method as described in claim 22, wherein the plurality of regions comprise a plurality of sub-pixels, and wherein pixels are defined by two or more contiguous sub-pixels.

26. A method as described in claim 25, wherein each sub-pixel is smaller than each pixel projected on the projection screen by the projector.

27. A method as described in claim 22, wherein the plurality of regions are formed by expelling the absorption material over the substrate.

28. A method as described in claim 22, wherein the one or more absorption materials include one said absorption material selected from the group consisting of:
   an optical filter;
   a pigment;
   an optical coating;
   an optical dye; and
   any combination thereof.

29. A projection screen as described in claim 22, wherein each of the one or more ranges has a spectral width selected from the group consisting of:

approximately 100 nanometers or less;
   approximately 35 nanometers or less; and
   approximately 5 nanometers or less.

30. A projection screen comprising a structure made by the method of claim 22.

31. A system comprising:
   means for projecting an image composed of visible light in one or more ranges of wavelengths; and
   means for displaying the projected image having:
      a plurality of regions that:
         at least one of reflect and transmit the one or more ranges of wavelengths to display the image; and
         absorb visible wavelengths of light in at least one other range that is not included in the one or mote ranges; and
      one or more spaces that are defined between adjacent said regions that at least one of reflect and transmit the one or more ranges and the at least one other range.

32. A system as described in claim 31, wherein the projecting means includes a projector.

33. A system as described in claim 31, wherein the displaying means includes a projection screen.

* * * * *

UNITED STATES PATENT AND TRADEMARK OFFICE
CERTIFICATE OF CORRECTION

| | | |
|---|---|---|
| PATENT NO. | : 7,293,879 B2 | Page 1 of 1 |
| APPLICATION NO. | : 10/691837 | |
| DATED | : November 13, 2007 | |
| INVENTOR(S) | : Adam Ghozeil et al. | |

It is certified that error appears in the above-identified patent and that said Letters Patent is hereby corrected as shown below:

In column 9, line 25, delete "though" and insert -- through --, therefor.

In column 14, line 14, in Claim 31, delete "mote" and insert -- more --, therefor.

Signed and Sealed this

Eleventh Day of November, 2008

JON W. DUDAS
*Director of the United States Patent and Trademark Office*